US011080271B2

(12) United States Patent
Lee et al.

(10) Patent No.: US 11,080,271 B2
(45) Date of Patent: Aug. 3, 2021

(54) GLOBAL DATABASE TRANSACTION MANAGEMENT SERVICE

(71) Applicant: SAP SE, Walldorf (DE)

(72) Inventors: Juchang Lee, Seoul (KR); Chang Gyoo Park, Gwanak-gu (KR); Francis Gropengiesser, Wiesloch (DE); Anil Kumar Goel, Waterloo (CA); Deok Koo Kim, Gwanak-gu (KR); SunHo Lee, Seoul (KR)

(73) Assignee: SAP SE

( * ) Notice: Subject to any disclaimer, the term of this patent is extended or adjusted under 35 U.S.C. 154(b) by 1025 days.

(21) Appl. No.: 15/261,582

(22) Filed: Sep. 9, 2016

(65) Prior Publication Data

US 2018/0075083 A1 Mar. 15, 2018

(51) Int. Cl.
*G06F 16/23* (2019.01)
*G06F 9/46* (2006.01)

(52) U.S. Cl.
CPC .......... *G06F 16/2379* (2019.01); *G06F 9/466* (2013.01); *G06F 16/2343* (2019.01); *G06F 16/2365* (2019.01)

(58) Field of Classification Search
None
See application file for complete search history.

(56) References Cited

U.S. PATENT DOCUMENTS

| 6,484,177 | B1 * | 11/2002 | Van Huben | G06F 16/282 |
| 7,289,992 | B2 * | 10/2007 | Walker | G06F 9/466 |
| 7,496,574 | B2 * | 2/2009 | Walker | G06F 9/466 |
| 7,844,585 | B2 * | 11/2010 | Walker | G06F 9/52 |
| | | | | 707/704 |
| 8,495,131 | B2 * | 7/2013 | Ahuja | G06F 9/52 |
| | | | | 709/203 |
| 9,098,522 | B2 * | 8/2015 | Lee | G06F 16/2329 |
| 2004/0215772 | A1 * | 10/2004 | Dinker | H04L 29/06 |
| | | | | 709/225 |
| 2006/0136464 | A1 * | 6/2006 | Rossmann | G06F 16/289 |
| 2007/0118523 | A1 * | 5/2007 | Bresch | G06F 16/2343 |
| 2008/0263549 | A1 * | 10/2008 | Walker | G06F 9/466 |
| | | | | 718/100 |
| 2013/0226890 | A1 * | 8/2013 | Markus | G06F 16/2365 |
| | | | | 707/703 |
| 2013/0226891 | A1 * | 8/2013 | Markus | G06F 16/2329 |
| | | | | 707/703 |
| 2013/0262423 | A1 * | 10/2013 | Graefe | G06F 16/2343 |
| | | | | 707/703 |

(Continued)

*Primary Examiner* — Ashish Thomas
*Assistant Examiner* — Mellissa M. Ohba
(74) *Attorney, Agent, or Firm* — Klarquist Sparkman, LLP

(57) ABSTRACT

A transaction management service layer monitors a plurality of read and write transactions being executed by the data engines by way of client libraries at each of a plurality of data engines. In addition, the transaction management server layer maintains and coordinates transaction timestamp and sequence numbers that are shared by the plurality of data engines. The transaction management service layer identifies and resolves conflicts among the plurality of transactions. The transaction management service layer is a separate and independent service that is isolated from other components of the plurality of data engines. Related apparatus, systems, techniques and articles are also described.

14 Claims, 4 Drawing Sheets

(56) References Cited

U.S. PATENT DOCUMENTS

| | | | |
|---|---|---|---|
| 2016/0070589 A1* | 3/2016 | Vermeulen | G06F 9/466 |
| | | | 711/153 |
| 2016/0086260 A1* | 3/2016 | Vermeulen | G06Q 40/00 |
| | | | 705/35 |
| 2016/0147449 A1* | 5/2016 | Andrei | G06F 16/2308 |
| | | | 707/814 |
| 2016/0371356 A1* | 12/2016 | Lee | G06F 16/273 |
| 2017/0177697 A1* | 6/2017 | Lee | H04L 67/10 |
| 2018/0074919 A1* | 3/2018 | Lee | G06F 11/1474 |

\* cited by examiner

GLOBAL DATABASE TRANSACTION MANAGEMENT SERVICE

TECHNICAL FIELD

The subject matter described herein relates to a loosely coupled global database transaction management service that is operable across multiple, heterogeneous data engines.

BACKGROUND

Conflicts can occur when multiple users concurrently perform read or write transactions on a database. Database transaction management services can help manage locks to prevent data stored within the database from being corrupted or invalidated when multiple users try to read data within the database while other users write to the database. These type of transaction management services can help ensure that users can only modify data within the database that has an associated lock giving the user exclusive access to such data until the lock is released. Locking not only provides exclusivity to write transactions, but also can selectively allow reading of unfinished uncommitted data.

Conflicts amongst concurrent transactions becomes significantly more complex within distributed database computing environments. Conventional database transaction management services within such environments are tightly coupled with components amongst various nodes. In addition, these database transaction management services are a single monolithic code base and operate a single process. Due to the lack of software component isolation and abstraction, these database transaction management services do not provide sufficient flexibility to extend and evolve for more complex distributed database environments. Moreover, conventional database transaction management services do not monitor transaction execution across heterogeneous databases.

SUMMARY

In a first aspect, a transaction management service layer monitors a plurality of read and write transactions being executed by the data engines by way of client libraries at each of a plurality of data engines. In addition, the transaction management server layer maintains and coordinates a transaction timestamp and sequence numbers that are shared by the plurality of data engines. The transaction management service layer identifies and resolves conflicts among the plurality of transactions. The transaction management service layer is a separate and independent service that is isolated from other components of the plurality of data engines.

At least a subset of the data engines can be heterogeneous.

The transaction management service layer can be executed, at least in part, by a transaction broker server separate from the data engines. The transaction broker server can maintain a global commit timestamp that is incremented when write transactions commit. The transaction broker server can provide snapshot isolation by assigning commit identifiers to committing write transactions and snapshot timestamps to starting read transactions. The transaction broker server can maintain a transaction identification generator which assigns transaction identifications to each transaction as it starts. The transaction broker server can provide a minimum snapshot timestamp which is used to determine which data in the data engines is to be subject to garbage collection.

The transaction management service layer can be executed, at least in part, by a lock manager server. The lock manager server can maintain a hierarchy of multi-granular lock tables used to detect transactional conflicts among concurrently executing transactions. The hierarchy of multi-granular lock tables can include table locks, partition locks, or record locks.

The conflicts can be resolved by the lock manager implementing at least one of: optimistic locking, pessimistic locking, or hybrid locking.

Each data engine can include a different client library embedded therein that wraps access methods associated with remote servers executing the transaction management service layer. The remote servers can include a transaction broker server and a lock manager server. The client libraries can group multiple requests originating from concurrently executing transactions. The client libraries can group and buffer multiple requests from a same transaction.

In another aspect, a system includes a plurality of data engines and a transaction management service layer cluster of servers executing a transaction management service layer. The plurality of data engines each store or otherwise makes data available to remote client computing systems and at least a portion of the data engines can be heterogeneous. The transaction management service layer monitors, via client libraries at each of the plurality of data engines, a plurality of read and write transactions being executed by the data engines, identifies conflicts among the plurality of transactions, and resolves the identified conflicts among the plurality of transactions. The transaction management service layer is a separate and independent service that is isolated from other components of the plurality of data engines.

The transaction management service layer cluster of servers can include a transaction broker server separate from the data engines that maintains a global commit timestamp that is incremented when write transactions commit, provides snapshot isolation by assigning commit identifiers to committing write transactions and snapshot timestamps to starting read transactions. maintains a transaction identification generator which assigns transaction identifications to each transaction as it starts, and provides a minimum snapshot timestamp which is used to determine which data in the data engines is to be subject to garbage collection.

The transaction management service layer cluster of servers can include a lock manager server that maintains a hierarchy of multi-granular lock tables used to detect transactional conflicts among concurrently executing transactions. The hierarchy of multi-granular lock tables comprise: table locks, partition locks, and/or record locks.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current transaction management service offers scalable transaction performance in massively scaled-out systems. Furthermore, the current subject matter is advantageous in that it offers a single shared database transaction management domain across multiple heterogeneous database systems.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides an innovative transaction management service layer for use in distributed and heterogeneous database computing environments. The transaction management service layer can be characterized as a micro-service architecture in that it can be cleanly isolated from all other components within an environment and it can be defined as a separate and independent service. The transaction management service layer can work as a separate process or it can be also embedded into any other database system, if needed.

The transaction management service layer provided herein can be architected to handle workloads from massive-scale-out database systems (i.e., systems having numerous nodes that are accessible by a large number of users concurrently executing read and write operations, etc.). In addition, various optimizations can be provided in both identifying and handling conflicts amongst concurrent transactions seeking to read and/or write the same data (e.g., data record, etc.) within a database system. Example optimizations include, but are not limited to optimistic concurrency control, hybrid locking (as described in co-pending U.S. patent application Ser. No. 15/260,943 filed concurrently herewith, the contents of which are hereby fully incorporated by reference), local transaction optimization, decentralized and optimistic two-phase commit, fine-granular garbage collection, inter-transaction group communication, and intra-transaction group communication.

The current subject matter also provides a set of well-defined artifacts and interfaces to integrate different heterogeneous data engines into a single transaction domain with minimal adaptation effort. To meet various requirements from various data engines, the current subject matter pursues versatility in terms of its feature set. For example, the current subject matter provides a rich set of isolation modes including the most strict serializable isolation and a few forms of relaxed consistency. Also, in terms of serialization mechanism, it can offers optimistic concurrency control and hybrid locking as well as the traditional pessimistic locking.

Figure 1:
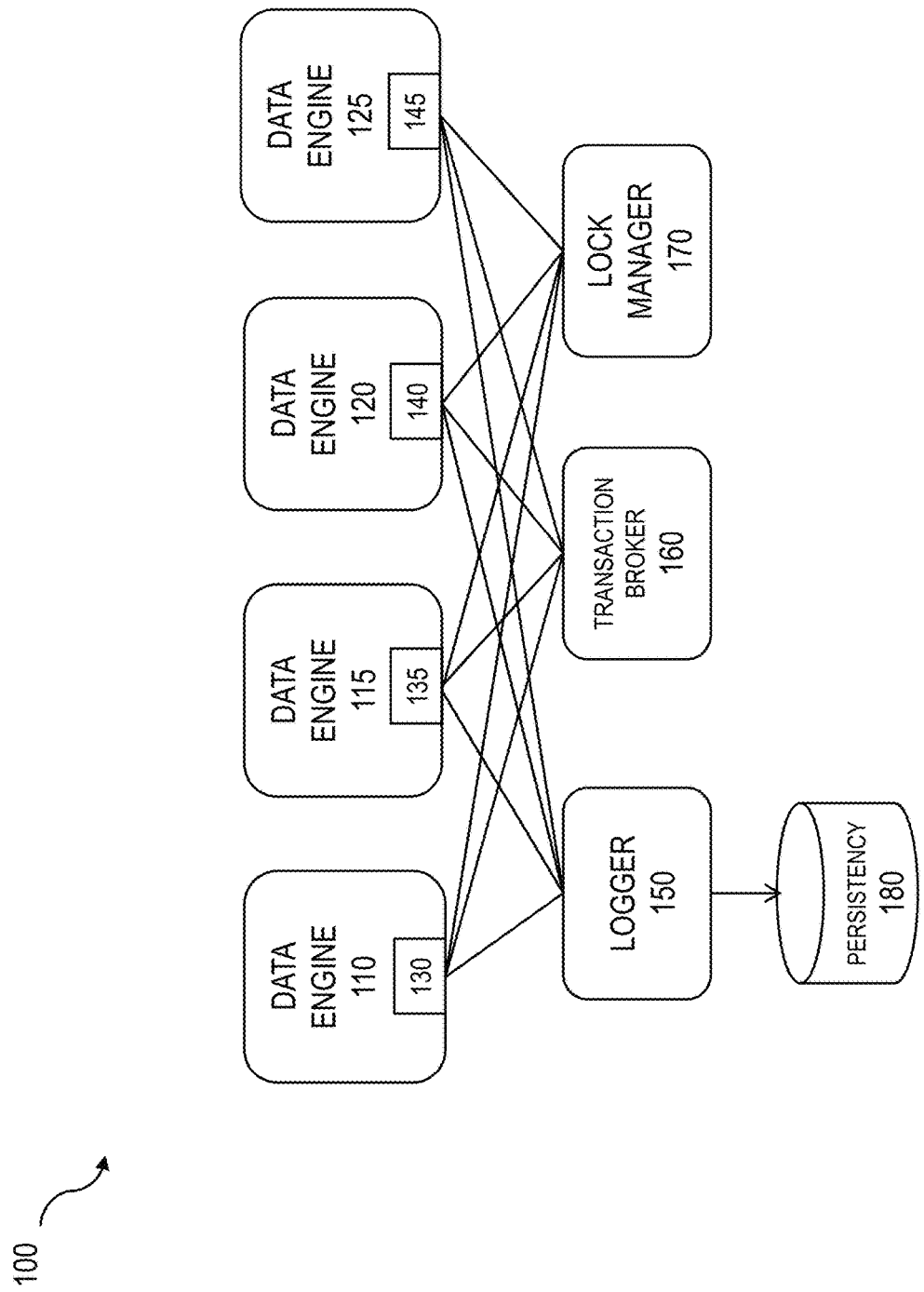
FIG. 1 is a system diagram illustrating an architecture for implementing a global transaction management service across multiple data engines.

FIG. 1 is a diagram 100 illustrating a distributed database computing environment for implementing a transaction management service layer in which there are a plurality of data engines 110, 120, 130, 140 which can be queried or otherwise access from each of a plurality of remote computing systems (not shown) via a computing network or networks. The data engines 110-125 can take various forms including, without limitation, in-memory database systems such as the SAP HANA database platform and in-memory query engines such as the SAP HANA VORA platform which plugs into the APACHE SPARK execution framework to provide enriched interactive analytics on data stored in HADOOP. The data engines 110-125 can also take other forms of databases and data engines such as Document Store, Key-Value Store or disk-based DBMS engines.

The data engines 110-125 are connected to a logger server 150 (coupled to physical persistency 180), a transaction broker server (TB) 160 and at least one lock manager server (LK) 170 via respective client libraries (CL) 130-145. The CL 130-145 can be embedded to nodes of the data engines 110-125. The CLs 130-145 can provide an abstraction of transactions wrapping up the access methods to the TB server 160 and the LK servers 170. If a data engine 110-125, which embeds the CL 130-145 in the same process boundary, calls an access method provided by the CL 130-145, the CL 130-145 can process the call and, if necessary, communicate with the backend TB server 160 and/or the LK servers 170. During communication, the CL 130-145 can also apply optimization to group multiple concurrent requests into a single physical call in order to efficiently utilize the given network bandwidth (called as inter-transaction grouping). If there are multiple concurrent transactions which are making commit requests to TB server 160, for example, then the requests can be merged and grouped into a single physical network call and also, at the TB server 160, the requests from the concurrent transaction can be processed concurrently. Or, if a call to the TB server 160 or the LK server 170 need not be made synchronously, the CL 130-145 can selectively buffer the call and then aggregate the call with the next consecutive calls to minimize the network communication with the backend TB server 160 or LK server 170 (called as intra-transaction grouping). For example, if a transaction is executing multiple statements and each of the statement is required to acquire a separate lock item at LK server 170, the lock requests from the same transaction can be buffered at the CL side 130-145 (instead of making the lock request call on each statement execution during the course of the transaction life time) and then a single physical network request can be made at the commit time of the transaction. The CL 130-145 need not maintain their own persistency but can rely on an external persistency, which could be shared-log persistency or conventional database persistency as provided in the respective data engine 110-125. In addition, the TB server 160 and LK server 170 can respectively have multiple instances to provide performance scalability and/or for high availability purposes. In addition, in some variations, the data engines 110-140 can communicate directly with the logger server 150, the transaction broker server (TB) 160 and the at least one lock manager server (LK) 170 directly without the use of a CL 130-145.

The logger server 150 can log the various read and write transactions across the data engines 110-125 in the persistency 180. The CLs 130-145 provide information about the respective read and write operations at each of the data engines 110-125 to provide coordination for the transaction management service layer. In addition, the logger server 150 can harmonize or otherwise transform data from the CLs 130-145 into a unified format.

The TB server 160 can maintain a global commit timestamp (GCT) which can be incremented when a (global) write transaction commits across one or more of the data engines 110-125. The GCT can play a central role in snapshot isolation implementation. All the read transactions can acquire a start timestamp (i.e., the snapshot timestamp) by reading the GCT value at the time when the transactions start and then, based on the assigned start timestamp value, it is decided which data should be visible to the transaction or not during the course of the query processing in the transaction. For example, transaction T1 starts a query execution and then a transaction T2 inserts a new record R1 into the database and commits. Then, by the requirement of snapshot isolation, T2's committed data R1 should not be visible to the transaction T1 because T1 started earlier than T2's commit operation. This visibility control is achieved by maintaining the GCT, which is increment on every transaction commit, and assigning the transaction start timestamp based on the GCT value. In addition, the TB server 160, based on the GCT, can offer a commit identification (CommitID) to committing write transactions and a snapshot timestamp to starting read transactions (or statements) which, in turn, provides visibility control especially under snapshot isolation. In some variations, in order to avoid too frequent access to the TB server 160 from the respective CL 130-145, a snapshot timestamp can be assigned from local commit timestamp (LCT), which is a cached value of GCT, maintained by the individual CLs 130-145.

The TB server 160 can also maintain a transaction identification (TID) generator. When a transaction starts, the transaction can acquire its unique identifier from the TID generator. Again, in order to avoid too frequent access to the TB server 160 from the CLs 130-145, a range of TID values can be cached at the individual CLs 130-145. And then, after consuming all the cached values, the CLs 130-145 request the next set of unused TID values to TB server 160.

The TB server 160 can also maintain a list of active consistent views (i.e., read transactions or read statements) in order to provide necessary information (e.g., minimum snapshot timestamp, etc.) to MVCC (multi-version concurrency control) garbage collectors. Again, in order to avoid too frequent access to the TB server 160 from the CLs 130-145, instead of updating the minimum snapshot timestamp value, the CLs 130-145 can asynchronously and lazily update the minimum snapshot timestamp values of the TB server 160. If the CLs try to update the minimum snapshot timestamp value of TB whenever a statement or a transaction finishes. The minimum snapshot timestamp value can be used for correct garbage collection under MVCC. For example, when a transaction T1 starts, its snapshot timestamp must be registered at the TB server 160. Otherwise, the record versions which should be visible to T1 could be deleted by a background garbage collector. However, in order to avoid retaining record versions too long, the snapshot timestamp can be unregistered from the TB server 160 after finishing the execution of transaction T1. Unregistering the snapshot timestamp need not happened immediately upon the transaction or query completion, but rather, the unregistering can be delayed slightly. With such an arrangement, the retention time of record versions can slightly increase and it can avoid a network round trip at the time of the transaction or query completion. The LK server 170 can maintain a hierarchy of multi-granular lock tables. F or example, the locks can pertain to one or more of table locks, partition locks and record locks such that the LK server 170 can detect transactional conflicts among concurrent transactions, following the chosen conflict detection method per transaction. Various conflict detection methods can be used including, without limitation, optimistic concurrency control (OCC), pessimistic locking (PL), or a hybrid version (HL) of OCC and PL (which is described in concurrently filed patent application referenced above). As most conflict detection methods have trade-offs, users can choose the right one considering their own scenarios. Particularly, for transactions running under PL or HL, the LK server 170 can offer automatic deadlock detection by reading through the corresponding lock table(s) and analyzing each table/partition/record being locked to identify a list of transactions seeking to lock such table/partition/record to create a identify deadlocks.

The LK server 170 can also maintain a value lock table for uniqueness check purpose among concurrent transactions. Users can give an arbitrary string as a lock key to check, using the value lock table, if there are any other write transaction which attempts to use the same key.

In addition to the optimizations to minimize interactions with underlying TB server 160 and the LK server 170, described above (e.g. LCT, caching a range of TID values), the CLs 130-145 can optimize the interactions with the TB server 160 and the LK server 170 by grouping multiple requests coming from concurrent transactions (called inter-transaction grouping) or by grouping multiple requests of the same transaction with buffering them at CL side 130-145 (called intra-transaction grouping).

Figure 2:
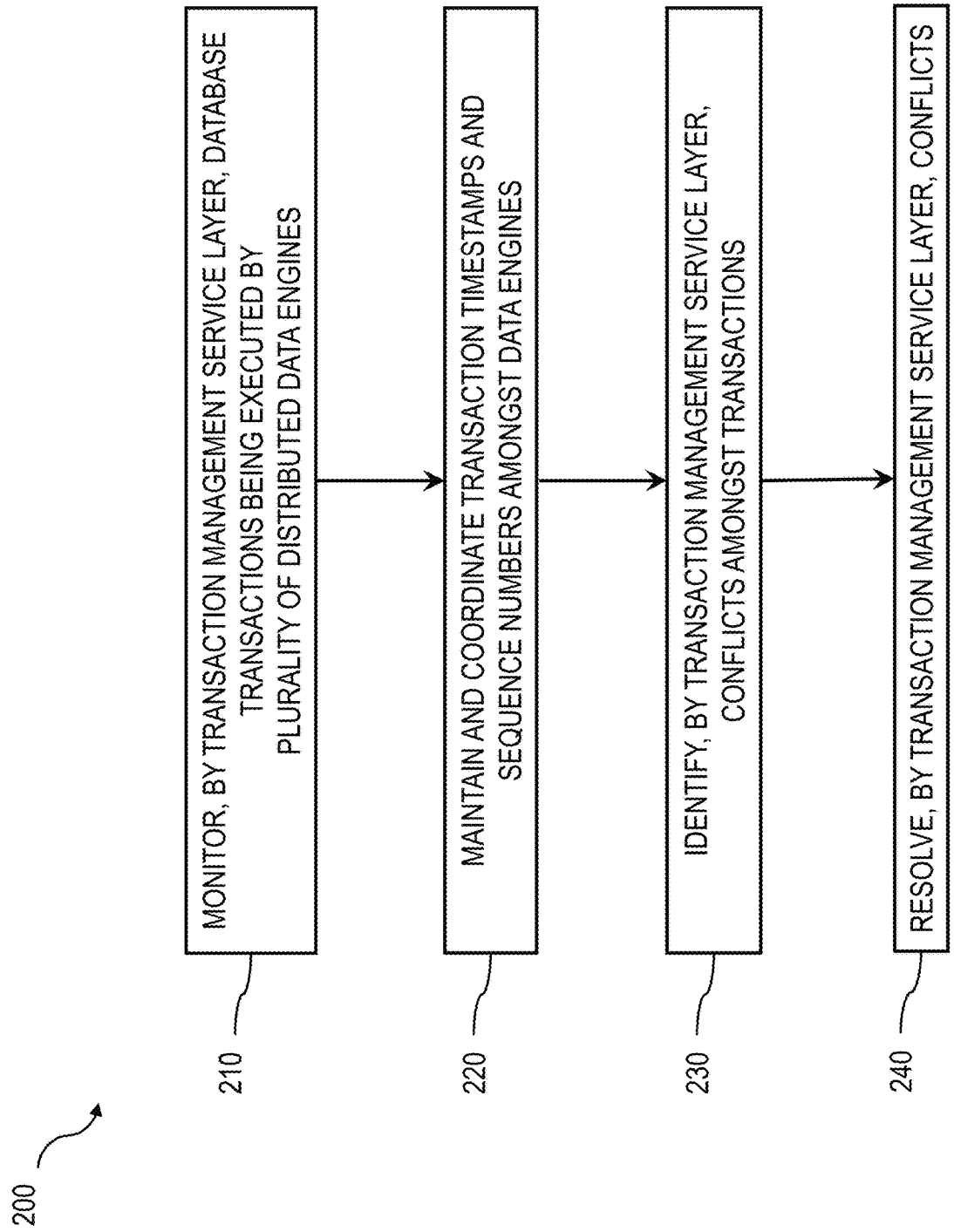
FIG. 2 is a process flow diagram illustrating the resolution of conflicts by a global transaction management service amongst concurrently executing read and write transactions across multiple data engines.

FIG. 2 is a process flow diagram 200 in which, at 210, a transaction management service layer monitors a plurality of read and write transactions being executed by each of a plurality of data engines. The transaction management service layer can perform such monitoring via client libraries at each of a plurality of data engines. In addition, the transaction management server layer, at 220, maintains and coordinates transaction timestamp and sequence numbers that are shared by the plurality of data engines. Subsequently, at 230, the transaction management service layer identifies conflicts among the plurality of transactions. Thereafter, at 240, the transaction management service layer resolves the identified conflicts among the plurality of transactions. With such an arrangement, the transaction management service layer is a separate and independent service that is isolated from other components of the plurality of data engines.

Figure 3:
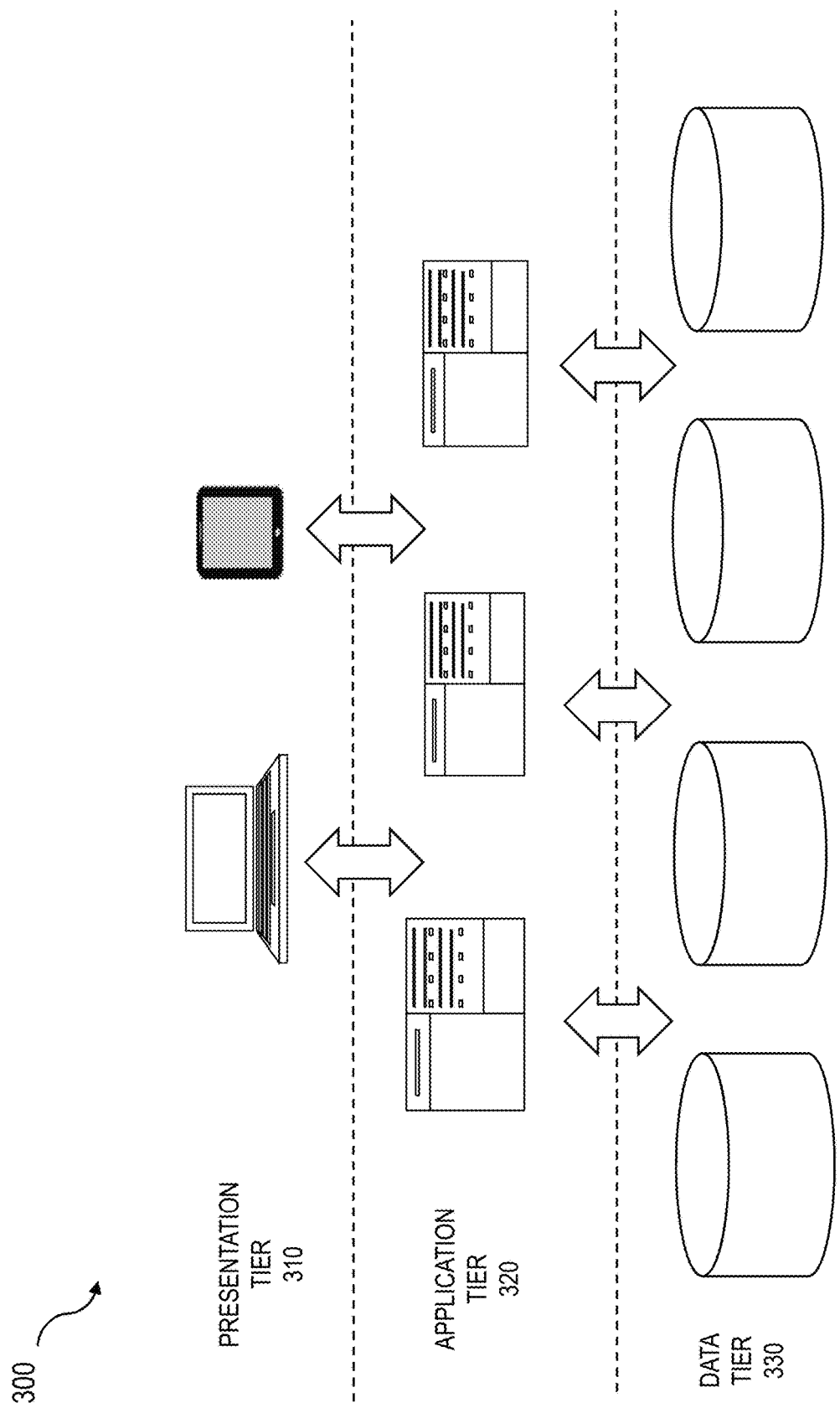
FIG. 3 is a system diagram illustrating a multi-tier computing architecture.

FIG. 3 is a diagram 300 illustrating an example multi-tier architecture including a presentation tier 310, an application tier 320, and a data tier 330 that can be executed across multiple computing devices (e.g., a client-server architecture, etc.). Each of these tiers 310, 320, 330 can, in some cases, be implemented by separate and distinct computing devices/data storage devices/database (e.g., client devices in the presentation tier 310, servers in the application tier 320, and databases in the data tier 330, etc.) and, in other cases, be implemented by a single computing device. The current subject matter is directed to identifying abnormal activity in layers which, in turn, can be used to determine, whether any events are likely to be malicious in nature (e.g., malware, etc.).

The presentation tier 310 can execute a topmost layer in the multi-tier architecture which can be referred to, for example, as a presentation layer, which in turn, can, for example, execute user interface functionality (e.g., data presentation, interaction with graphical user interfaces, etc.). The presentation tier 310 can directly communicate with the application tier 320 and indirectly communicate with the data tier 330 via the application tier 320 and translate tasks from both tiers 320, 330 for user interaction.

The application tier 320 can include an application layer that includes logic to initiate queries to the data tier 330, to process results from the data tier 330 for ultimate presentation at the presentation tier 310, and to handle other data coordination and manipulation activities.

The data tier 330 can include data persistence mechanisms (database servers, file shares, etc.) and a data access layer that encapsulates the persistence mechanisms and exposes the data and additionally include the transaction management service layer as described above and which can be implemented, for example, by the transaction broker 160, the lock manager 170, the logger 150 in combination with the client libraries 1300145). The data access layer can provide an interface to the application tier 320 that exposes methods of managing the stored data without exposing or creating dependencies on the data storage mechanisms while being subject to the transaction conflict management provided by the transaction management service layer. Avoiding dependencies on the storage mechanisms allows for updates or changes without the application tier 320 clients being affected by or even aware of the change.

It will be appreciated that, unless otherwise specified, the current subject matter is applicable to arrangements with different layers and/or that work with different computing architectures (including a single client device). For example, each of the tiers 310, 320, 330 can include multiple layers including, for example, various abstraction levels being executed at the presentation tier 310, various database/data access layers forming part of either of the application layer 320 or the data layer 330 and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 4:
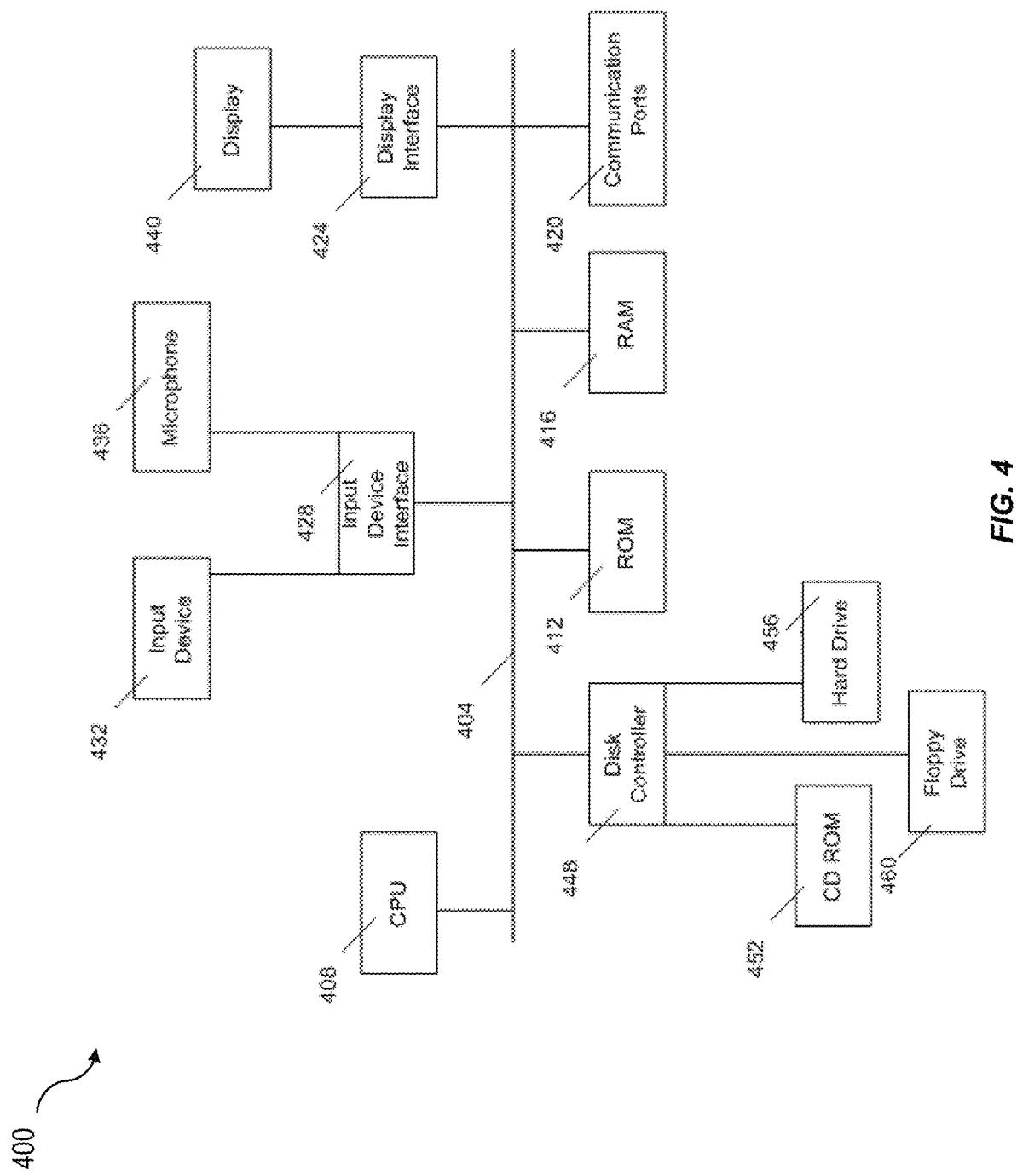
FIG. 4 is a system diagram illustrating a computing device to implement aspects of the current subject matter.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 414, can be in communication with the processing system 408 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives may be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 436, or tactile feedback); and input from the user may be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   monitoring, by a transaction management service layer executed by a transaction broker server and a lock manager server and via client libraries at each of a plurality of data engines, a plurality of read and write transactions being executed by the data engines, at least a subset of the data engines being heterogeneous;
   maintaining and coordinating, by the transaction management service layer, transaction timestamp and sequence numbers that are shared by the plurality of data engines;
   identifying, by the transaction management service layer, conflicts among the plurality of transactions; and
   resolving, by the transaction management service layer, the identified conflicts among the plurality of transactions;
   wherein:
   the transaction management service layer is a separate and independent service that is isolated from other components of the plurality of data engines to provide a single transaction domain across the heterogeneous data engines;
   the transaction management service layer is executed, at least in part, by a transaction broker server separate from the data engines that maintains a global commit timestamp that is incremented when write transactions commit;
   each data engine comprises a different client library embedded therein that wraps access methods associated with the transaction broker server and the lock manager executing the transaction management service layer, the access methods being called by the respective data engine such that the corresponding client library processes such calls and communicates with the transaction broker server and the lock manager server;
   the transaction broker server provides snapshot isolation by assigning commit identifiers to committing write transactions and snapshot timestamps to starting read transactions;
   the lock manager server maintains a hierarchy of multi-granular lock tables used to detect transactional conflicts among concurrently executing transactions;
   the transaction broker server provides a minimum snapshot timestamp which is used to determine which data across all of the data engines is to be subject to garbage collection.

2. The method of claim 1, wherein the transaction broker server maintains a transaction identification generator which assigns transaction identifications to each transaction as it starts.

3. The method of claim 1, wherein the transaction broker server provides a minimum snapshot timestamp which is used to determine which data in the data engines is to be subject to garbage collection.

4. The method of claim 1, wherein the hierarchy of multi-granular lock tables comprise: table locks, partition locks, and record locks.

5. The method of claim 1, wherein the conflicts are resolved by the lock manager implementing a hybrid of optimistic locking and pessimistic locking such that database transactions are committed prior to corresponding lock requests being granted and such transactions are rolled back if such lock requests are not granted.

6. The method of claim 1, wherein the client libraries group multiple requests originating from concurrently executing transactions.

7. The method of claim 5, wherein the client libraries group and buffer multiple requests from a same transaction.

8. The method of claim 1, wherein the client libraries are embedded to nodes of the data engines.

9. The method of claim 8, wherein if a first of the data engines, which embeds a first client library within a same process boundary, calls an access method provided by a second client library, the second client library processes the call and communicates with at least one of the transaction broker server and a lock server.

10. A system comprising:
   a plurality of data engines each storing or otherwise making data available to remote client computing systems, at least a portion of the data engines being heterogeneous, each data engine comprising at least one programmable data processor and memory,
   a transaction broker server and a lock manager server forming a transaction management service layer;
   wherein the transaction management service layer:

monitors, via client libraries at each of the plurality of data engines, a plurality of read and write transactions being executed by the data engines;

maintains and coordinates transaction timestamp and sequence numbers that are shared by the plurality of data engines;

identifies conflicts among the plurality of transactions;

resolves the identified conflicts among the plurality of transactions using optimistic concurrency control, hybrid locking such that database transactions are committed prior to corresponding lock requests being granted and such transactions are rolled back if such lock requests are not granted; and is a separate and independent service that is isolated from other components of the plurality of data engines to provide a single transaction domain across the heterogeneous data engines;

wherein the transaction broker server provides a minimum snapshot timestamp which is used to determine which data across all of the data engines is to be subject to garbage collection.

11. The system of claim 10, wherein the transaction broker server:

provides snapshot isolation by assigning commit identifiers to committing write transactions and snapshot timestamps to starting read transactions; and maintains a transaction identification generator which assigns transaction identifications to each transaction as it starts.

12. The system of claim 11, wherein the a lock manager server maintains a hierarchy of multi-granular lock tables used to detect transactional conflicts among concurrently executing transactions.

13. The system of claim 12, wherein the hierarchy of multi-granular lock tables comprise: table locks, partition locks, and record locks.

14. A non-transitory computer program product storing instructions which, when executed by at least one data processor forming part of at least one computing device, perform operations comprising:

monitoring, by a transaction management service layer executed by a transaction broker server and a lock manager server and via client libraries at each of a plurality of data engines, a plurality of read and write transactions being executed by the data engines, at least a portion of the data engines being heterogeneous;

maintaining and coordinating, by the transaction management service layer, transaction timestamp and sequence numbers that are shared by the plurality of data engines;

identifying, by the transaction management service layer, conflicts among the plurality of transactions; and resolving, by the transaction management service layer, the identified conflicts among the plurality of transactions;

wherein:

the transaction management service layer is a separate and independent service that is isolated from other components of the plurality of data engines;

each data engine comprises a different client library embedded therein that wraps access methods associated with both of a transaction broker server and a lock manager server that together execute the transaction management service layer;

the transaction broker server maintaining a global commit timestamp which is incremented when a global write transaction commits across one or more of the data engines;

the lock manager resolves conflicts using a hybrid of optimistic locking and pessimistic locking such that database transactions are committed prior to corresponding lock requests being granted and such transactions are rolled back if such lock requests are not granted; and the transaction broker server provides a minimum snapshot timestamp which is used to determine which data across all of the data engines is to be subject to garbage collection.

* * * * *